United States Patent [19]

Zwiener

[11] 4,320,785
[45] Mar. 23, 1982

[54] MECHANISM ON SHUTTLELESS LOOMS FOR THE TRANSFER OF THE END OF THE WEFT YARN

[75] Inventor: Rudolf Zwiener, Arbon, Switzerland

[73] Assignee: Adolph Saurer Limited, Arbon, Switzerland

[21] Appl. No.: 118,641

[22] Filed: Feb. 4, 1980

[30] Foreign Application Priority Data

Feb. 5, 1979 [CH] Switzerland ................ 1119/79

[51] Int. Cl.³ .......................................... D03D 47/14
[52] U.S. Cl. ................................ 139/444; 139/429; 139/194
[58] Field of Search ................ 139/429, 430, 443, 444, 139/445, 446, 448, 450, 194

[56] References Cited

U.S. PATENT DOCUMENTS

| | | | |
|---|---|---|---|
| 3,908,710 | 9/1975 | Mullekom | 139/194 |
| 3,939,877 | 2/1976 | Demuth | 139/194 |
| 4,071,051 | 1/1978 | Strauss | 139/194 |

FOREIGN PATENT DOCUMENTS 1303453  1/1973  United Kingdom ............... 139/444

*Primary Examiner*—Henry Jaudon
*Attorney, Agent, or Firm*—Bailey, Dority & Flint

[57] ABSTRACT

A mechanism on shuttleless looms for the transfer of the end 17′ of the weft yarn from a yarn holder 26, 27 on a nosegripper 6 of a yarn insertion needle to a yarn clamp 13, 14 arranged on the machine frame and immovable in the weft direction. The yarn clamp 13, 14 includes a carrier which can move to swing in time with the reed 2 and has two oscillating levers 7, 10 which carry at their ends the jaws 13, 14 which grip the weft yarn. The one oscillating lever 7 is connected rigidly to the carrier, while the other lever 10 is stressed elastically via a rubber sleeve 12 into the gripping position with the one oscillating lever 7. The jaw 14 is held back by cooperation with a stop 15, while the jaw 13 moves on. The yarn clamp 13, 14 hereby automatically gets spread for the release of the end of the weft yarn or respectively for accepting the next weft yarn end.

7 Claims, 4 Drawing Figures

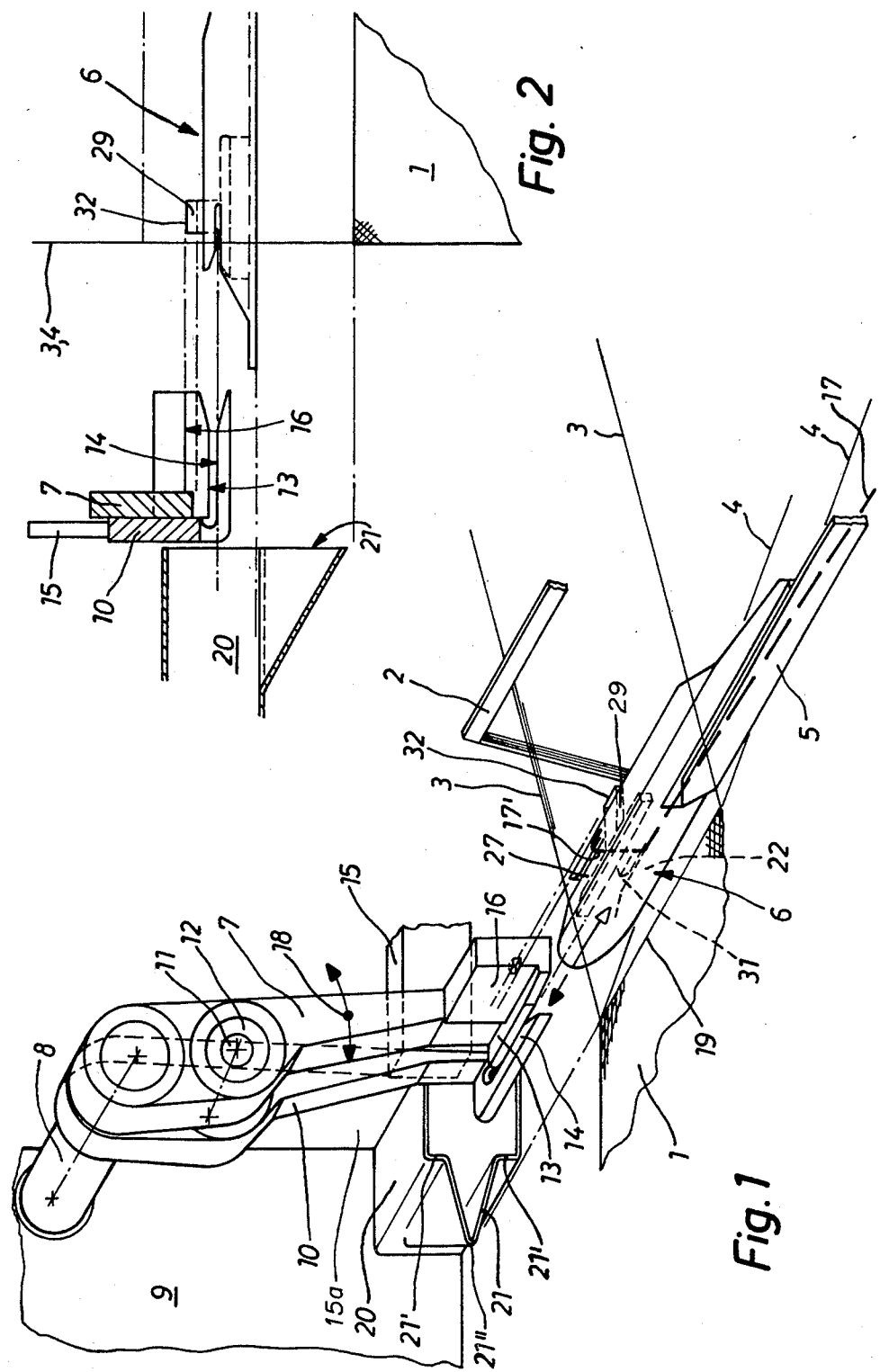

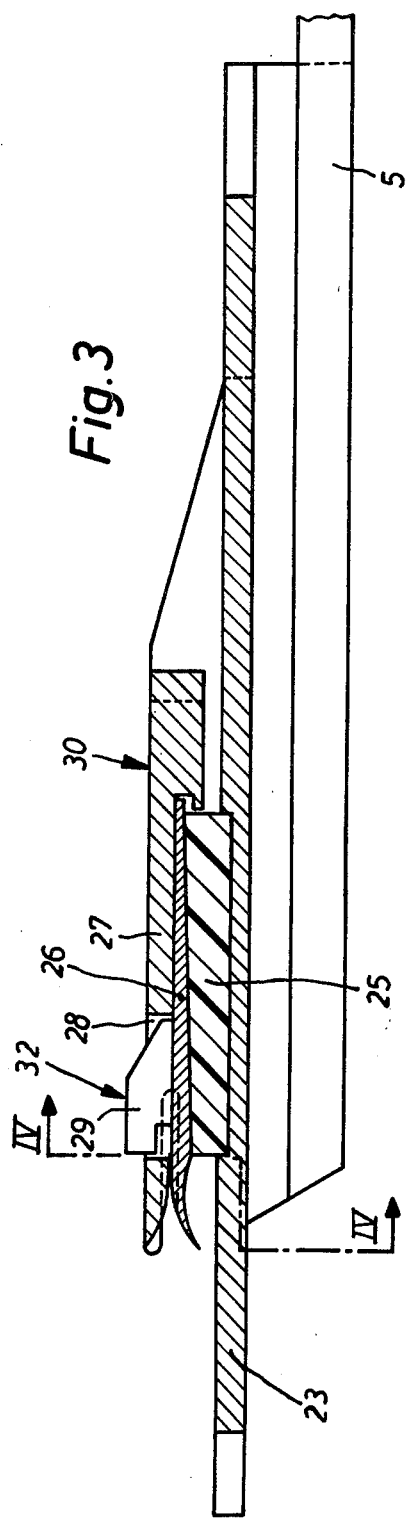
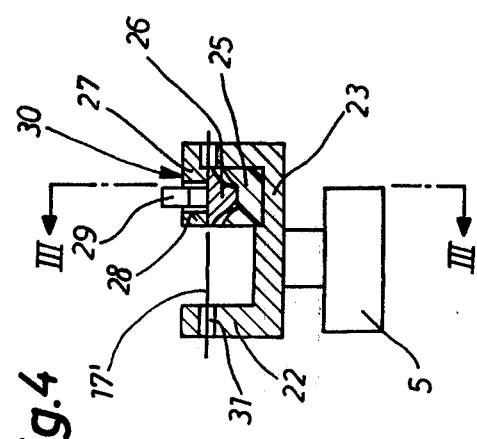

MECHANISM ON SHUTTLELESS LOOMS FOR THE TRANSFER OF THE END OF THE WEFT YARN

BACKGROUND OF THE INVENTION

The invention refers to a mechanism on shuttleless looms for the transfer of the end of the weft yarn from a forklike nose-gripper which is arranged on the nose of the weft-inserter and in which the end of the weft yarn at the weft insertion is held transversely to the direction of insertion between a yarn gripper carried by one horn of the nose-gripper and capable of being spread from outside by means of a thrust-piece and a yarn guide on the other horn of the nose-gripper, to a further yarn gripper having arms which press together under spring action and are capable of being spread from outside.

Mechanisms for the transfer of the end of the weft yarn, which is carried transversely to the direction of insertion of the nose-holder on a weft-inserter and held by inherently springy tongues on a yarn holder, to the end holder on a second weft-inserter which cooperates with the first weft-inserter in the center of the shed of shuttleless looms having weft-inserters which penetrate into the shed from both sides of the shed, are known (e.g. U.S. Pat. Nos. 2,119,573 and 2,567,993). In that case the end-holder is hook-shaped and exhibits an inner tongue which presses against the hook. The hook and the tongue can be spread from outside. Means are provided around the hook which force the end of the yarn into the region of the hook after the latter has gone under the end of the yarn upon interengagement of the ends of the holder. Upon the ends of the holder running apart, the end of the weft yarn held by the springy tongues of the nose-holder gets torn away by the hook and carried along trapped between the hook and the tongue pressing against it. At the end of the outwards movement of the end gripper out of the shed, the hook and the tongue pressing against it are spread apart and the end of the yarn is taken over by a third yarn holder fastened to the machine frame.

This known transfer of the end of the yarn from one holder to the other has the disadvantage that the weft yarn gets considerably stressed in the region of the end of the yarn. The introduction into the spring tongues or respectively the tearing away from them leads to individual fibers being detached and remaining caught in the holders, whereby these rapidly become dirty and consequently interfere. The described transfer of the ends of the yarn furthermore cannot be used for transferring the weft yarn from a nose-gripper to a yarn holder arranged on the machine frame and immovable in the weft direction, as is necessary in the case of looms having weft-insertion by a single weft-inserter having a gripper arranged on the nose.

The object of the invention is to create a mechanism of the kind mentioned initially, which enables transfer to a yarn holder arranged on the machine frame and immovable in the weft direction, and furthermore keeps the nose-gripper clean in service and hence efficient in operation.

SUMMARY OF THE INVENTION

This problem is in accordance with the invention solved in the way that the further yarn clamp is arranged on the machine frame to be immovable in the weft direction, that the jaws of the further yarn clamp, which are oriented essentially in the weft direction, are carried by a bearer which swings in the direction of weave in time with the reed between a rear end position and a front end position, in such a way that a jaw fixed to the bearer lies in the rear end position of the bearer behind the path of motion of the end of the weft yarn, held by the nose-gripper, while the other jaw connected movably to the bearer is held in this rear end position of the bearer against a fixed stop in a position in front of the path of motion of the end of the weft yarn. Both jaws of the yarn clamp in the front end position of the bearer lie essentially in a straight line with the weft yarn being beaten up by the reed, where the bearer exhibits a stop-face which stands at least approximately perpendicular to its direction of motion and which in the rear end position of the bearer is in contact with the projecting end of a thrust-piece for the spreading of the yarn holder of the approaching nose-gripper.

For keeping clean both the yarn clamp and the nose-gripper holder the opening of a suction pipe is arranged close behind the bearer in its rear end position in the weft-insertion direction.

In order to take up the force acting upong the thrust-piece for the spreading of the nose-gripper holder, it is advantageous to dimension at least part of the inside front wall of the suction pipe, in line with the front wall of the tip of the nose-gripper, for length in such a way that its front part in the end position of the weft-inserter projects into the suction pipe.

In order that a long free end of yarn in the case of overswing of the holder carrier from its rear end position to its front end position during beating-up of the inserted weft yarn does not get out of the range of action of the suction pipe, the opening in this pipe at least in the region of the plane of weave advantageously extends essentially as far as in a straight line with the stop edge.

Accordingly, it is an important object of the present invention to provide a mechanism for transferring the end of yarn from the yarn holder carried on the yarn inserting needle to a yarn clamp.

Another important object of the present invention is to provide a suction system positioned adjacent a yarn holder for removing the severed end of the yarn created during transfer of the yarn.

These and other objects and advantages of the invention will become apparent upon reference to the following specification, attendant claims and drawings.

BRIEF DESCRIPTION OF THE DRAWINGS

FIG. 1 is a perspective elevation of a mechanism constructed in accordance with the invention;

FIG. 2 is a plan of the mechanism shown in FIG. 1;

FIG. 3 is a top view longitudinal section through a nose-gripper holder of the mechanism along the line III—III in FIG. 4; and FIG. 4 is a cross-section through the nose-gripper at the level of the yarn holder along the line IV—IV in FIG. 3.

DESCRIPTION OF A PREFERRED EMBODIMENT

In the Figures the reference numbers designate: 1—woven material; 2—a reed; 3—warp threads of the upper shed; 4—warp threads of the lower shed; 5—of weft yarn insertion needle of a shuttleless loom, in which the weft yarn 17 is laid into the shed by a single weft-inserter; 6—a nose-gripper on the weft yarn insertion needle 5. The reference number 7 designates an oscillating lever connected fixedly in rotation to a shaft 8 as the carrier means of an elongated narrow fillet or clamping jaw 13 arranged at the end of it at the height of the woven goods and orientated in the weft direction. The shaft 8 is supported in a gearbox 9 on the loom and by a transmission (not shown) working inside it is driven in a known way not described in greater detail, in time with the slay movement in alternate directions of rotation. The shaft 8 thereby displaces the oscillating lever 7 in an oscillating motion indicated by the double arrow 18. A second oscillating lever 10 is supported rotatably on the shaft 8 and serves as the carrier means of a second fillet or clamping jaw 14 arranged on the end of it at the height of the jaw 13 and in parallel with the latter. The oscillating lever 10 exhibits at a distance radially from the shaft 8 a pin 11 which in parallel with the shaft 8 reaches as far as the oscillating lever 7 and passes through it in a cylindrical rubber sleeve 12 which is imbedded in a bearing in a bore in the oscillating lever 7. The bearing of the rubber sleeve 12 in the oscillating lever 7 and the pin 11 as carried by lever 10 are mutually offset in such a way that a biasing force is exerted to press the jaws against one another springly without additional external action. Hence the oscillating levers 7 and 10 form with the jaws 13 and 14 the arms of a yarn gripper for the weft yarn, which close under the action of the rubber sleeve 12. A stop 15 in the plane of oscillation of the oscillating lever 10 is connected rigidly to the machine frame at 15a. This stop 15 does not let the jaw 14 arrive in or respectively beyond the path of the weft yarn being inserted, if the oscillating lever 7 which is taking it with it swings towards the right beyond its rear end position as seen in FIG. 1, in which the jaw 13 lies directly behind the path of the weft yarn. Hence in the rear end position of the oscillating lever 7, the clamp formed by the jaws 13, 14 is open. The opening 21 of an air suction pipe 20 is arranged directly behind the oscillating lever 10, looking in the direction of the weft insertion. The opening extends in the direction of weave as far as in a straight line with the stop edge 19 of the fabric 1.

The nose-gripper 6 on the weft insertion needle 5 is made forklike with two horns 22 and 27. These horns are carried in parallel with the plane of weave by a wall 23 standing perpendicular to it and are directed towards the slay. The upper horn carries a yarn holder consisting of the fixed arm 27 of the horn and a plate 26 which presses against this arm 27 under the action of a rubber or respectively rubberlike cushion 25. The plate 26 exhibits a thrust-piece 29 which projects through an opening 28 in the arm 27 and stands out beyond the surface 30 of the arm. This serves as a guide for the plate 26 in the arm 27 as well as for the yarn lying in the trapper and at the same time for opening of the trapper from outside. The lower horn 22 of the holder exhibits an indentation 31 in which the weft yarn 17 gets laid during insertion, so that the end 17' of the weft yarn between the trapper on the horn 27 and the indentation 31 on the horn 22 lies perpendicular to the plane of weave and hence to the direction of insertion. The end of the wall 23 projects so far forward that in the position of the insertion needle displaced furthest forwards it penetrates into the air suction pipe 20. The front wall of the air suction pipe exhibits two parts 21', the inner surfaces of which lie in a plane flush with the front face of the wall 23 of the gripper 6 and have between them a distance which is formed by a V-shaped scoop 21" projecting out of the suction pipe 20, and is less than the height of the wall 23.

The oscillating lever arm 7 has at its end directly above the jaw 13 a projection having a front face 16 which extends radially with reference to shaft 8 and extends in the direction of weft insertion. As the yarn inserter 6 arrives at the end of its weft insertion stroke, the front face 16 of the projection is closely adjacent the rear face 32 of the thrust piece 29 which also corresponds to the rear end position of the lever arm 7.

The mechanism works as follows

At the end of the insertion stroke of the needle 5 the nose-gripper 6 comes into the space which is swept by the oscillating levers 7, 10 in their swinging motion. These levers are lying in their rear end position (in FIG. 1 on the right). In this position the tip of the weft yarn standing vertically arrives in the open jaws 13, 14, the thrust-face 32 of the thrust-piece 29 arrives in front of the face 16 of the projection on the lever 7 and the end of the front wall of the gripper arrives behind the faces of the parts 21' of the front wall of the air suction pipe. At about the time of the reversal of the motion of the insertion needle the movement of the lever 7 starts from its rear end position towards its front end position, i.e., from right to left as seen in FIG. 1. Thereupon the face 16 presses against the thrust-piece 29 and opens the jaws of the clamp, while the front wall 23 of the left insert abuts against the rear face of the parts 21' of the front wall of the air suction pipe 20 to support the force required by the opening of the jaws. At the same time the jaws 13, 14 close because the jaw 13 fastened to the lever 7 approaches the stationary jaw 14 on the lever 10 pressing against the stop 15, and seizes the end of the weft yarn. As long as the lever arm 10 is pressed against the abutment 15 by the resilient action of the lever bushing 12 between the lever arms 7 and 10, the jaw 14 is stationary. The pressure of the face 16 against the thrust-piece 29 is transmitted by the wall 23 on the gripper 26 to the parts 21' of the wall of the air suction.

During the return motion of the insertion needle 5 the gripper 6 leaves the space swept by the levers 7, 10. These levers swing out together and jointly with the reed 2 towards their front end position in a straight line with the stop edge 19. The weft yarn 17 which has been inserted is beaten-up by the reed, the end of the weft yarn projecting out of the shed is transferred to a stationary holding clamp and cut off between the latter and the clamp 13, 14 in known manner as illustrated in U.S. Pat. No. 4,078,586 for the purpose of further insertion later by means of the insertion needle.

The cut off piece of yarn remains in the yarn clamp 13, 14 and swings back with it into the rear end position. In doing so, the lever 10 strikes against the stop s 15, the clamp 13, 14 opens for receiving the next end of weft yarn and in doing so releases the cut off piece of yarn. This is drawn into the suction pipe by the flow of suction air. The air flow at the same time sucks fluff off the holder 6 and hence keeps the latter clean. If the free end of weft yarn carried along by the holder 6 happens to be abnormally long, already as the holder approaches its end position it is seized by the air flow from the suction pipe and drawn into the latter where it remains during the whole swinging movement of the levers 7, 10.

While the preferred embodiment of the invention has been described using specific terms, such description is for illustrative purposes only, and it is to be understood that changes and variations may be made without departing from the spirit or scope of the following claims.

What is claimed is:

1. A weft yarn transfer mechanism for shuttleless looms of the type having a weft inserter on which a forklike nose-gripper is arranged having a pair of spaced horns, a yarn holder carried by one horn of the nose-gripper capable of being opened, a thrust-piece carried by said nose-gripper for opening said yarn holder, a yarn guide carried on the other horn of the nose-gripper, said weft yarn being held between said yarn holder and said yarn guide transverse to the direction of weft insertion, and a second yarn holder having jaws which press together under resilient action and capable of being opened wherein said second holder comprises:

carrier means mounted on a machine frame of said loom carrying said second yarn holder;

said second yarn holder having first and second yarn gripping jaws;

said carrier means being pivotable in a plane transverse to the direction of weft insertion between a rear position and a front position;

said first jaw lying behind a path of travel of said weft yarn during weft insertion when said carrier means is in said rear position;

said second jaw being rotatably carried by said carrier means, said second jaw bearing against a fixed stop when said carrier means is in said rear position wherein said second jaw occupies a position in front of said path of travel of said weft yarn, whereby said jaws are opened;

said carrier means including a stop-face oriented generally perpendicular to its path of pivotal motion, said stop face contacting said thrust-piece of said yarn holder of said nose-gripper to open said yarn holder.

2. A mechanism as in claim 1, including a suction pipe having an opening adjacent said carrier means.

3. A mechanism as in claim 2 wherein said suction pipe includes an inside wall portion arranged in line with a front end portion of said nose-gripper, said front end portion of said nose-gripper projecting into said suction pipe when said weft inserter is in an end position.

4. A mechanism as in claim 2, wherein the opening of said suction pipe extends essentially as far as a stop edge of the weave.

5. A mechanism as in claim 1 wherein said carrier means includes two oscillating lever arms, a first of which is fixed in rotation to a shaft driven in alternate directions of rotation and a second lever arm is connected to the first lever arm by means of an elastic connection.

6. A weft yarn transfer mechanism for a shuttleless loom for transferring an end of a weft yarn from a yarn holder carried by a weft inserter as said weft inserter travels in a path perpendicular to a warp direction, said mechanism comprising:

a rotatable carrier;

a first lever arm (7) fixedly carried by said rotatable carrier;

a second lever arm (10) rotatably carried by said rotatable carrier;

a first clamping jaw (13) carried by said first lever arm (7) adjacent the path of travel of said weft inserter;

a second clamping jaw (14) carried by said second lever arm (10) adjacent the path of travel of said weft inserter;

a resilient connection means (12) provided between said first and second lever arms, forcing said first and second clamping jaws together for gripping said yarn; and an abutment means (15) carried in the path of said second lever (10) arm for limiting the movement of said second lever arm (10) as said rotatable carrier moves said first lever arm from a first position to a second position causing said first and second clamping jaws to be opened.

7. The mechanism as set forth in claim 6 further comprising:

a suction pipe (20) having an opening (21) arranged adjacent said first and second clamping jaws.

* * * * *